(12) United States Patent
Zhang et al.

(10) Patent No.: US 12,497,026 B2
(45) Date of Patent: Dec. 16, 2025

(54) AUGMENTED REALITY ASSISTED PARKING WITH DRIVER-IN-LOOP SELECTIONS AND ALIGNMENTS OF FEATURE POINT VICINITIES

(71) Applicant: GM Global Technology Operations LLC, Detroit, MI (US)

(72) Inventors: Yuan Zhang, Shanghai (CN); Wenyuan Qi, Shanghai (CN); Bo Yu, Troy, MI (US); Tianxiang Cao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 273 days.

(21) Appl. No.: 18/471,841

(22) Filed: Sep. 21, 2023

(65) Prior Publication Data

US 2025/0083663 A1    Mar. 13, 2025

(30) Foreign Application Priority Data

Sep. 7, 2023   (CN) .......................... 202311152475.8

(51) Int. Cl.
*B60K 35/00*       (2024.01)
*B60K 35/23*       (2024.01)
(Continued)

(52) U.S. Cl.
CPC ............. *B60W 30/06* (2013.01); *B60K 35/00* (2013.01); *B60W 50/10* (2013.01); *B60W 50/14* (2013.01);
(Continued)

(58) Field of Classification Search
CPC ...... B60W 30/06; B60W 50/10; B60W 50/14; B60W 2050/146; B60W 2552/00;
(Continued)

(56) References Cited

U.S. PATENT DOCUMENTS

| 2022/0097734 | A1* | 3/2022 | Limaye | G06V 20/56 |
| 2023/0102144 | A1* | 3/2023 | Wan | G06F 3/017 |
| | | | | 701/25 |
| 2024/0199048 | A1* | 6/2024 | Hatfield | B60W 30/06 |

FOREIGN PATENT DOCUMENTS

| DE | 102016108718 A1 | 11/2016 |
| DE | 102017128294 A1 | 6/2018 |

(Continued)

*Primary Examiner* — Abby Lin
*Assistant Examiner* — Renee LaRose
(74) *Attorney, Agent, or Firm* — Vivacqua Crane, PLLC (57) ABSTRACT

A system for augmented-reality (AR)-assisted vehicle parking with operator-in-loop selections and alignments of feature point vicinities (FPVs) includes a vehicle, human-machine interfaces (HMIs), sensors detecting FPVs of a parking location and controllers. The controllers have a processor, memory, and input/output (I/O) ports in communication with the HMIs and sensors. The memory stores an AR-assisted parking application (ARAPA) executed by the processor. The AR-assisted parking application (ARAPA) has a training session (TS) and a live session (LS), and is activated upon completing parking at a parking spot at the parking location. The TS portion trains the ARAPA to recognize FPVs of the parking spot. The LS portion prompts an operator to select the parking spot, guides the operator into the parking spot by displaying trained FPVs onto live sensor data displayed on the HMI, and instructs the operator to align the trained FPVs with corresponding real-world FPVs by maneuvering the vehicle.

16 Claims, 5 Drawing Sheets

(51) Int. Cl.
    *B60K 35/28*    (2024.01)
    *B60W 30/06*    (2006.01)
    *B60W 50/10*    (2012.01)
    *B60W 50/14*    (2020.01)
    *G08G 1/14*     (2006.01)
(52) U.S. Cl.
    CPC .............. *G08G 1/143* (2013.01); *B60K 35/23* (2024.01); *B60K 35/28* (2024.01); *B60K 2360/166* (2024.01); *B60W 2050/146* (2013.01); *B60W 2552/00* (2020.02)
(58) Field of Classification Search
    CPC .......... B60W 50/00; B60W 2050/0075; B60K 35/00; B60K 35/23; B60K 35/28; B60K 2360/166; B60K 2360/173; B60K 2360/177; B60K 2360/191; B60K 2360/21; B60K 35/22; G08G 1/143; B62D 15/0285; B62D 15/028; G06F 3/011; G06N 20/00; G05B 19/04
    See application file for complete search history.

(56)            References Cited

FOREIGN PATENT DOCUMENTS

DE      102021100548 A1    8/2021
DE      102021005530 A1    12/2021

* cited by examiner

AUGMENTED REALITY ASSISTED PARKING WITH DRIVER-IN-LOOP SELECTIONS AND ALIGNMENTS OF FEATURE POINT VICINITIES

INTRODUCTION

The present disclosure relates to driver assistance systems in vehicles, and more particularly to driver assistance systems that aid vehicle operators in vehicle parking processes.

In many vehicles, a driver assistance system has the ability to autonomously or semi-autonomously park a vehicle in a parking spot proximate to the vehicle. Typical driver assistance systems used in vehicle parking processes utilize a suite of sensors equipped to the vehicle and generate a path or to one or more parking spots. However, such systems often have difficulty determining paths due to perception capabilities of the suite of sensors, limitations on computational capacity, and the like.

Thus, while current systems and methods for autonomously or semi-autonomously parking vehicles achieve their intended purpose, there is a need for a new and improved system and method that overcomes fidelity issues in sensor data without significantly increasing computational burdens, without increasing system and/or component complexity, and which increases vehicle operator confidence and comfort.

SUMMARY

According to several aspects of the present disclosure, a system for augmented-reality (AR)-assisted vehicle parking with operator-in-loop selections and alignments of feature point vicinities (FPVs) includes a vehicle and one or more human-machine interfaces (HMIs) disposed within the vehicle. The system further includes one or more sensors disposed on the vehicle and detecting FPVs of a parking location and one or more controllers. Each of the one or more controllers has a processor, a memory, and one or more input/output (I/O) ports. The I/O ports communicate with the one or more sensors and the one or more HMIs. The memory stores programmatic control logic, and the processor executes the programmatic control logic. The programmatic control logic includes an AR-assisted parking application (ARAPA). A vehicle operator activates the ARAPA, via the HMI, upon completing parking at a parking spot at the parking location. The ARAPA includes a training session (TS) portion and a live session (LS) portion. In the TS portion, the ARAPA is trained to recognize FPVs of the parking spot at the parking location. In the LS portion, the ARAPA prompts a vehicle operator to select the parking spot, and guides the vehicle operator into the parking spot by displaying previously trained FPVs overlaid onto live sensor data displayed on the HMI. In the LS portion, the ARAPA instructs the vehicle operator to align the previously trained FPVs with corresponding real-world FPVs of the parking spot by maneuvering the vehicle.

In another aspect of the present disclosure, the TS portion further includes a first TS control logic portion in which the vehicle operator indicates that the vehicle has been parked in a preferred parking spot by selecting a first feature of the ARAPA via the HMI.

In yet another aspect of the present disclosure the TS portion further includes a second TS control logic portion in which the ARAPA utilizes the HMI to present a plurality of proposed FPVs overlaid on a real-time display of a view from the one or more sensors. The proposed FPVs at least partially define a current or an idealized position of the vehicle within the preferred parking spot. The second TS control logic portion further includes control logic that receives, via the HMI, inputs from the vehicle operator selecting some or all of the plurality of proposed FPVs. Each of the proposed FPVs has appropriate separations from other proposed FPVs, where the appropriate separation is chosen such that all selected FPVs may be simultaneously displayed on the HMI and so that different FPVs do not overlap at any line of sight of the vehicle operator. The appropriate separation reduces a potential for vehicle mis-alignment within the parking spot from a first level to a second level less than the first level as the vehicle is parked.

In yet another aspect of the present disclosure the TS portion further includes a third TS control logic portion in which the ARAPA suggests, via the HMI, FPVs and semantic tags corresponding to parking spots that the system has previously identified at the parking location.

In yet another aspect of the present disclosure the TS portion further includes a fourth TS control logic portion that offers, via the HMI, automatically generated proposed parking spot names and opportunities for the vehicle operator to alter the proposed parking spot names, and a fifth TS control logic portion that stores the proposed parking spot names and semantic tags in memory for use in the LS portion of the ARAPA.

In yet another aspect of the present disclosure the LS portion further includes a first LS control logic portion that determines that a current distance between the vehicle and one or more previously trained parking spots is less than or equal to a predefined FPV preview threshold distance. The FPV preview threshold distance is between approximately six meters and approximately 10 meters. The LS portion further includes a second LS control logic portion that offers, via the HMI, one or more prompts to the vehicle operator. The one or more prompts request the vehicle operator to select one of the one or more previously trained parking spots within the FPV preview threshold distance that the vehicle operator intends to park within.

In yet another aspect of the present disclosure the LS portion further includes a third LS control logic portion that provides augmented reality (AR) assistance to the vehicle operator as the vehicle operator provides directional inputs via steering adjustments, braking inputs, and acceleration inputs to guide the vehicle towards and into the previously trained parking spot. The AR assistance overlays FPVs of the previously trained parking spot on one or more of live sensor data displayed on the HMI and on a heads-up display (HUD) of the vehicle so that the FPVs are displayed directly in a line-of-sight of the vehicle operator and in positions corresponding to actual physical locations of the FPVs from an optical perspective of the vehicle operator.

In yet another aspect of the present disclosure the LS portion further includes a fourth LS control logic that determines that the vehicle is within the FPV preview threshold distance of one or more previously saved FPVs of parking spots in a parking location. The LS portion further includes a fifth LS control logic that conditionally displays a preview of the identified previously saved FPVs on one or more of the HMI and a head-sup-display (HUD), and uses previously-identified FPVs as enhanced steering guidance for the vehicle operator to align the vehicle within a parking spot to a distance that is equal to or less than a predefined FPV alignment threshold distance.

In yet another aspect of the present disclosure the LS portion further includes a sixth LS control logic that provides AR assistance to the vehicle operator as the vehicle operator provides directional inputs via steering adjustments, braking inputs, and acceleration inputs to guide the vehicle towards and into the parking spot identified by saved previously-identified FPVs. The AR assistance overlays the saved previously-identified FPVs on one or more of live sensor data displayed on the HMI and on the HUD of the vehicle so that the FPVs are displayed directly in a vehicle operator's line-of-sight and in positions corresponding to actual physical locations of the FPVs from the vehicle operator's optical perspective. A path to the saved previously-identified FPVs is displayed on one or more of the HUD and the HMI in a different style, color, or layout, in comparison to a path to a previously trained parking spot.

In yet another aspect of the present disclosure the LS portion further includes a seventh LS control logic that determines a current distance of the vehicle to a parking spot is less than or equal to the FPV alignment threshold distance and engages an FPV alignment mode of the ARAPA. The LS portion further includes an eighth LS control logic that utilizes AR to display previously-identified or saved FPVs on one or more of the HMI and the HUD, thereby providing the vehicle operator with references that the vehicle operator utilizes the align the vehicle within the parking spot in real-time. The LS portion further includes a ninth LS control logic that causes the vehicle operator to check alignments of the saved FPVs with corresponding features of a real-world environment for enhanced parking assistance and steers, or otherwise maneuvers the vehicle. The LS portion further includes a tenth LS control logic that notifies the vehicle operator that the vehicle has been completely parked when the saved FPV are aligned to real-world FPVs or environmental objects as viewed on either or both of the HMI and the HUD.

In yet another aspect of the present disclosure a method for augmented-reality (AR)-assisted vehicle parking with operator-in-loop selections and alignments of feature point vicinities (FPVs) includes detecting FPVs of a parking location with one or more sensors disposed on a vehicle. The method further includes executing programmatic control logic stored within a memory of one or more controllers in communication with the one or more sensors and in communication with one or more human-machine interfaces (HMIs) disposed within the vehicle. Each of the one or more controllers has a processor, the memory, and one or more input/output (I/O) ports. The I/O ports are in communication with the one or more sensors and the one or more HMIs. The processor executes control logic including an AR-assisted parking application (ARAPA). The method further includes activating, via a vehicle operator input through the HMI, the ARAPA upon completing parking at a parking spot at the parking location. The ARAPA is trained, in a training session (TS) portion, to recognize FPVs of a parking spot at the parking location. During a live session (LS) portion of the ARAPA, the vehicle operator is prompted to select the parking spot. The method further includes guiding the vehicle operator into the parking spot by displaying previously trained FPVs overlaid onto live sensor data displayed on the HMI and instructing the vehicle operator to align the previously trained FPVs with corresponding real-world FPVs of the parking spot by maneuvering the vehicle.

In yet another aspect of the present disclosure the TS portion further includes indicating, via a vehicle operator input to a first feature of the ARAPA in the HMI, that the vehicle has been parked in a preferred parking spot.

In yet another aspect of the present disclosure the TS portion further includes presenting, via the HMI, a plurality of proposed FPVs overlaid on a real-time display of a view from the one or more sensors. The proposed FPVs at least partially define a current or an idealized position of the vehicle within the preferred parking spot. The method further includes receiving, via the HMI, inputs from the vehicle operator selecting some or all of the plurality of proposed FPVs. Each of the proposed FPVs has appropriate separations from other FPVs, where the appropriate separation is chosen such that all selected FPVs may be simultaneously displayed on the HMI and so that different FPVs do not overlap at any line of sight of the vehicle operator. The appropriate separation reduces a potential for vehicle mis-alignment within the parking spot from a first level to a second level less than the first level as the vehicle is parked.

In yet another aspect of the present disclosure the TS portion of the method further includes suggesting to the vehicle operator, via the HMI, FPVs and semantic tags corresponding to parking spots that the ARAPA has previously identified at the parking location. The TS portion of the method further includes offering, via the HMI, automatically generated proposed parking spot names and opportunities for the vehicle operator to alter the proposed parking spot names, and storing the proposed parking spot names and semantic tags in memory for use in the LS portion of the ARAPA.

In yet another aspect of the present disclosure the LS portion of the method further includes determining that a current distance between the vehicle and one or more previously trained parking spots is less than or equal to a predefined FPV preview threshold distance. The FPV preview threshold distance is between approximately six meters and approximately 10 meters. The LS portion of the method further includes offering, via the HMI, one or more prompts to the vehicle operator. The one or more prompts request the vehicle operator to select one of the one or more previously trained parking spots within the FPV preview threshold distance that the vehicle operator intends to park within.

In yet another aspect of the present disclosure the LS portion of the method further includes providing augmented reality (AR) assistance to the vehicle operator as the vehicle operator provides directional inputs via steering adjustments, braking inputs, and acceleration inputs to guide the vehicle towards and into the previously trained parking spot. The AR assistance overlays FPVs of the previously trained parking spot on one or more of live sensor data displayed on the HMI and on a heads-up display (HUD) of the vehicle so that the FPVs are displayed directly in a line-of-sight of the vehicle operator and in positions corresponding to actual physical locations of the FPVs from an optical perspective of the vehicle operator.

In yet another aspect of the present disclosure the LS portion of the method further includes determining that the vehicle is within the FPV preview threshold distance of one or more previously saved FPVs of parking spots in a parking location; and conditionally displaying a preview of the previously saved FPVs on one or more of the HMI and a heads-up-display (HUD). The LS portion of the method also uses previously saved FPVs as enhanced steering guidance for the vehicle operator to align the vehicle within a parking spot to a distance that is equal to or less than a predefined FPV alignment threshold distance.

In yet another aspect of the present disclosure the LS portion of the method further includes providing AR assistance to the vehicle operator as the vehicle operator provides directional inputs via steering adjustments, braking inputs, and acceleration inputs to guide the vehicle towards and into the parking spot identified by previously-identified FPVs. The AR assistance overlays the previously-identified FPVs on one or more of live sensor data displayed on the HMI and on the HUD of the vehicle so that the FPVs are displayed directly in a line-of-sight of the vehicle operator and in positions corresponding to actual physical locations of the FPVs from an optical perspective of the vehicle operator. A path to the identified, previously saved FPVs is displayed on one or more of the HUD and the HMI in a different style, color, or layout, in comparison to a path to a previously trained parking spot.

In yet another aspect of the present disclosure the LS portion of the method further includes determining a current distance of the vehicle to a parking spot is less than or equal to the FPV alignment threshold distance and engages an FPV alignment mode of the ARAPA, and utilizing AR to display previously-identified or saved FPVs on one or more of the HMI and the HUD, thereby providing the vehicle operator with references that the vehicle operator utilizes the align the vehicle within the parking spot in real-time. The LS portion of the method further includes causing the vehicle operator to check alignments of the saved FPVs with corresponding features of a real-world environment for enhanced parking assistance and steers, or otherwise maneuvers the vehicle, and notifying the vehicle operator that the vehicle has been completely parked when the saved FPV are aligned to real-world FPVs or environmental objects as viewed on either or both of the HMI and the HUD.

In yet another aspect of the present disclosure a method for augmented-reality (AR)-assisted vehicle parking with operator-in-loop selections and alignments of feature point vicinities (FPVs) includes detecting FPVs of a parking location with one or more sensors disposed on a vehicle and executing programmatic control logic stored within a memory of one or more controllers in communication with the one or more sensors and in communication with one or more human-machine interfaces (HMIs) disposed within the vehicle. Each of the one or more controllers has a processor, the memory, and one or more input/output (I/O) ports. The I/O ports are in communication with the one or more sensors and the one or more HMIs, and the processor executes control logic including an AR-assisted parking application (ARAPA). The method further includes activating, via a vehicle operator input through the HMI, the ARAPA upon completing parking at a parking spot at the parking location. The ARAPA has control including control logic for training the ARAPA, in a training session (TS) portion, to recognize FPVs of a parking spot at the parking location. The TS portion further includes control logic for indicating, via a vehicle operator input to a first feature of the ARAPA in the HMI, that the vehicle has been parked in a preferred parking spot, and presenting, via the HMI, a plurality of proposed FPVs overlaid on a real-time display of a view from the one or more sensors. The proposed FPVs at least partially define a current or an idealized position of the vehicle within the preferred parking spot. The TS portion further includes control logic for receiving, via the HMI, inputs from the vehicle operator selecting some or all of the plurality of proposed FPVs, each of the proposed FPVs having appropriate separations from other FPVs, wherein the appropriate separation is chosen such that all selected FPVs may be simultaneously displayed on the HMI and so that different FPVs do not overlap at any line of sight of the vehicle operator; and wherein the appropriate separation reduces a potential for vehicle mis-alignment within the parking spot from a first level to a second level less than the first level as the vehicle is parked. The TS portion further includes control logic for suggesting to the vehicle operator, via the HMI, FPVs and semantic tags corresponding to parking spots that the ARAPA has previously identified at the parking location. The TS portion further includes control logic for offering, via the HMI, automatically generated proposed parking spot names and opportunities for the vehicle operator to alter the proposed parking spot names and for storing the proposed parking spot names and semantic tags in memory for use in a live-session (LS) portion of the ARAPA. The ARAPA further includes control logic for prompting the vehicle operator, in an LS portion of the ARAPA, to select a parking spot as the vehicle operator navigates through a parking location with one or more parking spots. The LS portion further includes control logic for determining that a current distance between the vehicle and one or more previously trained parking spots is less than or equal to a predefined FPV preview threshold distance. The FPV preview threshold distance is between approximately six meters and approximately ten meters. The LS portion further includes control logic for offering, via the HMI, one or more prompts to the vehicle operator. The one or more prompts request the vehicle operator to select one of the one or more previously trained parking spots within the FPV preview threshold distance that the vehicle operator intends to park within. The LS portion further includes control logic for providing augmented reality (AR) assistance to the vehicle operator as the vehicle operator provides directional inputs via steering adjustments, braking inputs, and acceleration inputs to guide the vehicle towards and into the previously trained parking spot. The AR assistance overlays FPVs of the previously trained parking spot on one or more of live sensor data displayed on the HMI and on a heads-up display (HUD) of the vehicle so that the FPVs are displayed directly in a line-of-sight of the vehicle operator and in positions corresponding to actual physical locations of the FPVs from an optical perspective of the vehicle operator. The LS portion further includes control logic for determining that the vehicle is within the FPV preview threshold distance of one or more previously saved FPVs of parking spots in a parking location. The LS portion further includes control logic for conditionally displaying a preview of the previously saved FPVs on one or more of the HMI and a heads-up-display (HUD), and for using previously-identified FPVs as enhanced steering guidance for the vehicle operator to align the vehicle within a parking spot to a distance that is equal to or less than a predefined FPV alignment threshold distance. The LS portion further includes control logic for providing AR assistance to the vehicle operator as the vehicle operator provides directional inputs via steering adjustments, braking inputs, and acceleration inputs to guide the vehicle towards and into the parking spot identified by previously-identified FPVs. The AR assistance overlays the previously-identified FPVs on one or more of live sensor data displayed on the HMI and on the HUD of the vehicle so that the FPVs are displayed directly in the vehicle operator's line-of-sight and in positions corresponding to actual physical locations of the FPVs from the vehicle operator's optical perspective. A path to the identified, previously saved FPVs is displayed on one or more of the HUD and the HMI in a different style, color, or layout, in comparison to a path to a previously trained parking spot. The LS portion further includes control logic for instructing the vehicle operator to align the previously trained FPVs with corresponding real-world FPVs of the parking spot by maneuvering the vehicle by: determining a current distance of the vehicle to a parking spot is less than or equal to the FPV alignment threshold distance and engages an FPV alignment mode of the ARAPA. The LS portion further includes control logic for utilizing AR to display previously-identified or saved FPVs on one or more of the HMI and the HUD, thereby providing the vehicle operator with references that the vehicle operator utilizes the align the vehicle within the parking spot in real-time, and for causing the vehicle operator to check alignments of the saved FPVs with corresponding features of a real-world environment for enhanced parking assistance and steers, or otherwise maneuvers the vehicle. The LS portion further includes control logic for notifying the vehicle operator via one or more of the HUD and the HMI that the vehicle has been completely parked when the saved FPV are aligned to real-world FPVs or environmental objects as viewed on either or both of the HMI and the HUD.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
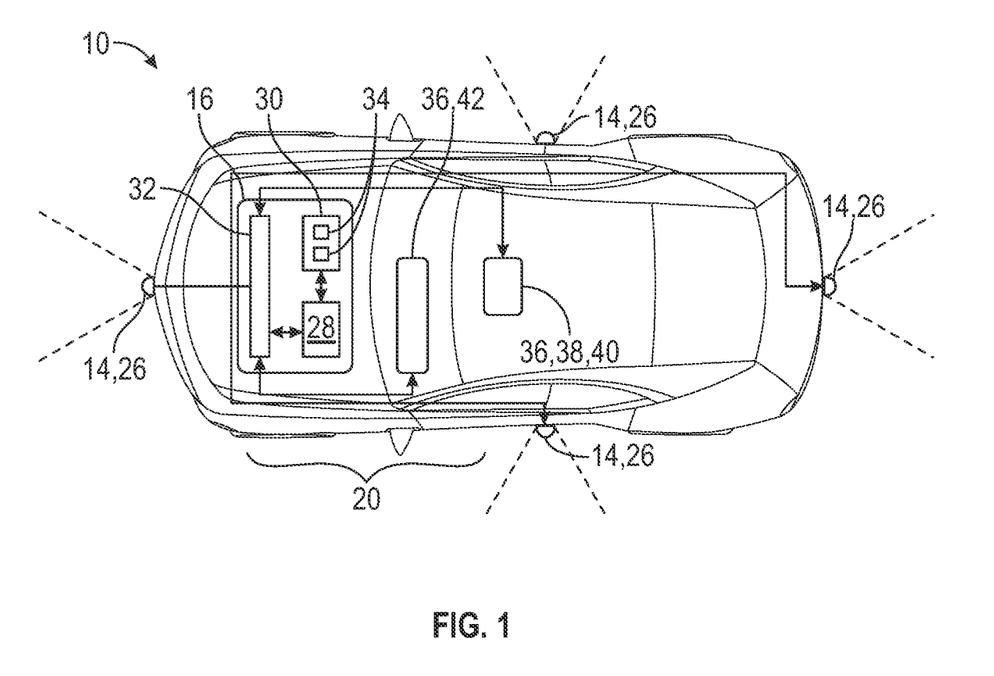
FIG. 1 is a schematic view of a system for augmented reality (AR)-assisted parking with operator-in-loop selections and alignments (DSAs) of feature point vicinities (FPVs) according to an exemplary embodiment.
Figure 2A:
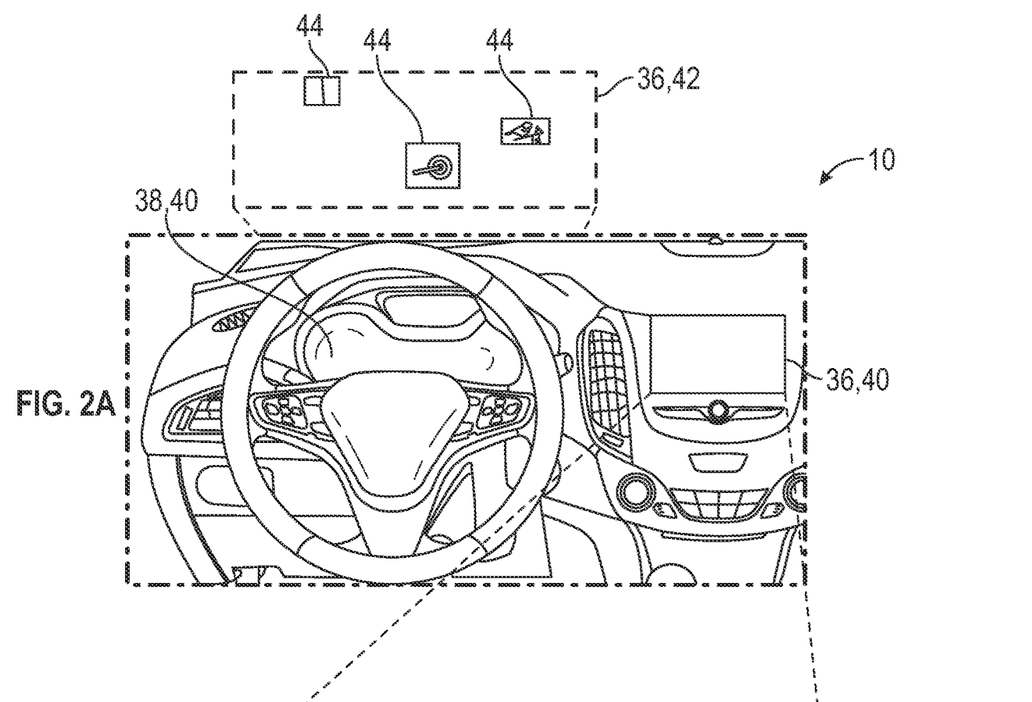
FIG. 2A is a perspective view of an interior of a vehicle equipped with the system for AR-assisted parking with DSAs of FPVs of FIG. 1 according to an exemplary embodiment.
Figure 2B:
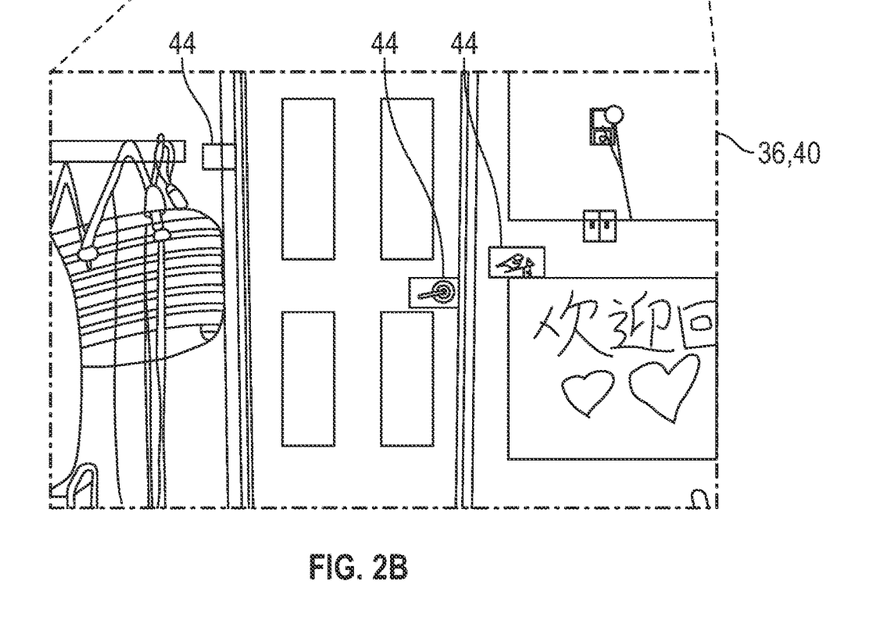
FIG. 2B is an enlarged view of a human-machine-interface (HMI) disposed in the interior of the vehicle equipped with the system for AR-assisted parking with DSAs of FPVs of FIG. 1 according to an exemplary embodiment of FIG. 2A according to an exemplary embodiment.

Referring to FIGS. 1, 2A and 2B, a system 10 for augmented reality (AR)-assisted parking with operator-in-loop selections and alignments (OSAs) of feature point vicinities (FPVs) is shown. The system 10 includes a vehicle 12 equipped with one or more sensors 14 and one or more controllers 16. The vehicle 12 may be any of a wide variety of vehicles including cars, trucks, sport-utility vehicles (SUVs), buses, semi-tractors, tractors used in farming or construction or the like, watercraft, aircraft such as planes or helicopters, or the like. In some examples, the vehicle 12 travels along a road 18 having any type of road 18 surface, including pavement, gravel, dirt, ice, or other types of surfaces.

The sensors 14 may be any of a wide variety of sensors 14 which may be linked to and communicate on a communications network 20, such as a vehicle-to-vehicle (V2V) communications network, a vehicle-to-infrastructure (V2I) network, or the like. The sensors 14 capture data about surroundings of the vehicle 12, including electromagnetic and/or optical information in a variety of different wavelengths, including those visible to humans, as well as infrared, ultraviolet, and other such portions of the light spectrum that are not visible by humans. The sensors 14 may further include Global Positioning System (GPS) sensors, cameras 26, Light Detection and Ranging (LiDAR) sensors, Radio Detection and Ranging (RADAR) sensors, Sound Navigation and Ranging (SONAR) sensors, ultrasonic sensors, inertial measurement units (IMUs), wheel speed sensors, and any of a variety of other sensors 14 capable of determining vehicle 12 position and dynamic state information relative to the environment surrounding the vehicle 12 without departing from the scope or intent of the present disclosure. In several aspects, the sensors 14 may be integrated onto or into the vehicle 12, or may be fitted in an after-sales services performed by the vehicle 12 manufacturer, dealer, customer, or by other third parties without departing from the scope or intent of the present disclosure. In some examples, the one or more sensors 14 may be part of a stand-alone sensor 14 system without departing from the scope or intent of the present disclosure.

The controllers 16 are non-generalized electronic control devices having a preprogrammed digital computer or processor 28, non-transitory computer readable medium or memory 30 used to store data such as control logic, software applications, instructions, computer code, data, lookup tables, etc., and one or more input/output (I/O) ports 32. Computer readable medium or memory 30 includes any type of medium capable of being accessed by a computer, such as read-only memory (ROM), random access memory (RAM), a hard disk drive, a compact disc (CD), a digital video disc (DVD), solid-state memory, or any other type of memory. A "non-transitory" computer readable medium or memory 30 excludes wireless, optical, or other communication links that transport electrical or other signals. A non-transitory computer readable medium or memory 30 includes media where data can be permanently stored and media where data can be stored and later overwritten, such as any type of program code, including source code, object code, and executable code. The processor 28 is configured to execute the code or instructions. In some examples, the controller 16 may be a dedicated wireless or Wi-Fi controller. The I/O ports 32 are configured to communicate through wired or wireless means such as the communications network 20 including the V2V communications network and/or V2I communications network using Wi-Fi protocols under IEEE 802.11x, Bluetooth communications protocols, radio frequency (RF) protocols, or the like.

In several aspects, the controllers 16 include one or more applications 34. An application 34 is a software program configured to perform specific functions or sets of functions. The application 34 may include one or more computer programs, software components, sets of instructions, procedures, functions, objects, classes, instances, related data, or a portion thereof adapted for implementation in a suitable computer readable program code. The applications 30 may be stored within the memory 30 or in an additional or separate memory 30. Examples of the applications 30 include audio or video streaming services, audio or visual processing services, an AR-assisted parking application (ARAPA) 34 and the like.

Turning now to FIG. 2A more specifically, the system 10 further includes an in-vehicle 12 human-machine interface (HMI) 36 to interact with vehicle 12 operators. In several aspects, the HMI 36 includes one or more devices capable of interacting with the vehicle 12 operator, such as a screen disposed within the vehicle 12 such as an instrument cluster 38, an infotainment screen 40, a heads-up display (HUD) 42 or the like. However, it should be appreciated that other HMIs 34 are considered herein as well. For example, the HMI 36 may be a mobile device, such as a tablet computer, a mobile phone, or the like, and the HMI 36 may be provided by the vehicle 12 operator and temporarily mounted to or disposed on an interior passenger compartment component of the vehicle 12. In examples in which the HMI 36 is a mobile device as described above, it will be appreciated that at least a portion of the ARAPA 34 is carried out onboard the mobile device.

Turning now to FIG. 2B, and with continued reference to FIGS. 1 and 2A, an exemplary ARAPA 34 is shown as displayed on an exemplary infotainment screen 40 of the vehicle 12. The ARAPA 34 contains control logic portions that cause the HMI 36 to utilize a display scheme used in simultaneous localization and mapping (SLAM) based vehicle 12 parking assistance. In several aspects, the ARAPA 34 includes a training session (TS) portion 100 and a live session (LS) portion 200. In the TS portion 100, the ARAPA 34 is trained to recognize feature point vicinities (FPVs) 44 of a particular parking spot 46. During the TS, the vehicle 12 operator parks the vehicle 12 within a parking spot 46 at a parking location 48 that the vehicle 12 operator has chosen. The vehicle 12 operator then activates the ARAPA 34 via the HMI 36.

Figure 3:
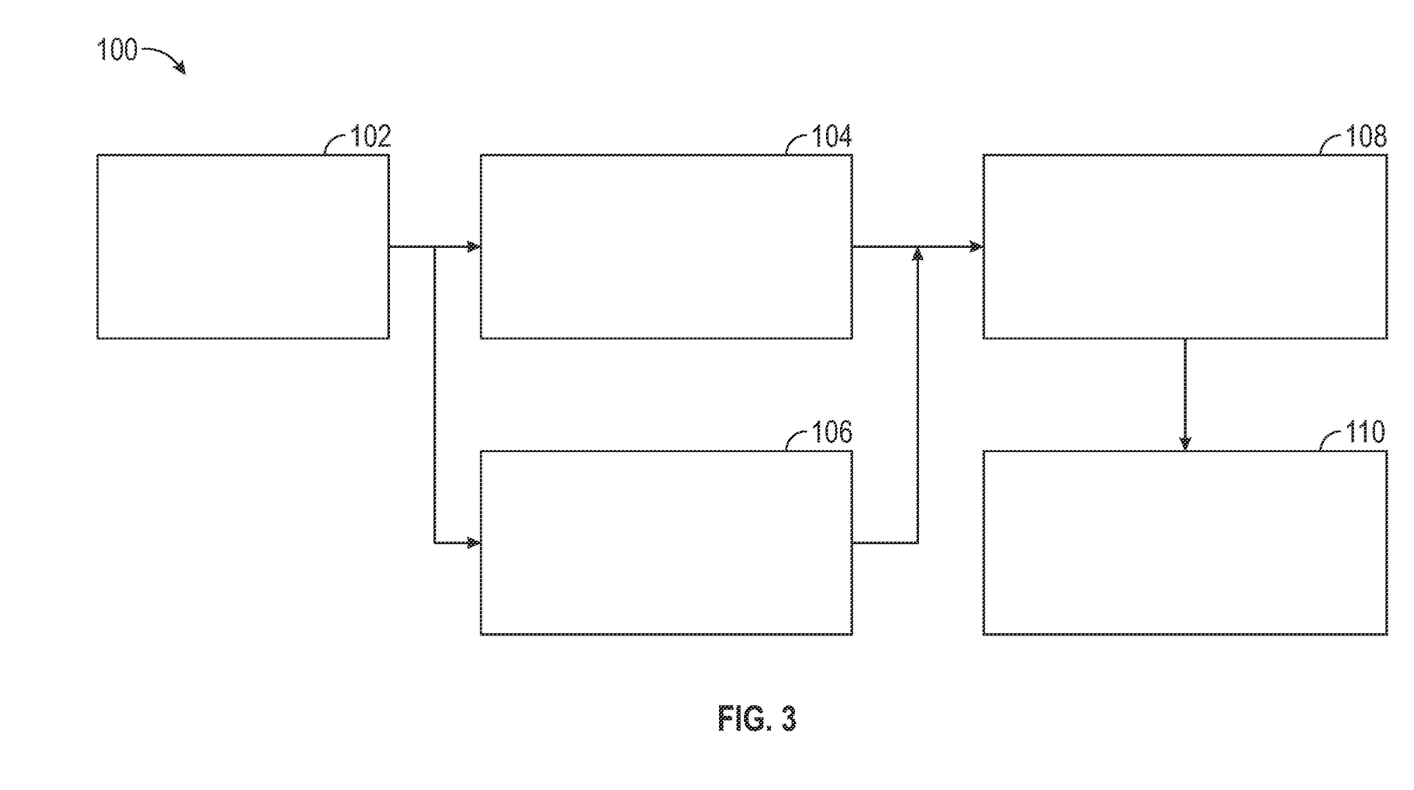
FIG. 3 is a is a flowchart depicting control logic of a training session of the system for AR-assisted parking with DSAs of FPVs of FIG. 1 according to an exemplary embodiment.

Turning now to FIG. 3, and with continuing reference to FIGS. 1, 2A and 2B, the TS portion 100 of the ARAPA 34 is shown in further detail. In a first TS control logic portion 102, the vehicle 12 operator indicates the completion of a parking in the vehicle 12 within the ARAPA 34 within the HMI 36 by selecting a first feature disposed within the ARAPA 34 that informs or confirms to the system 10 that the vehicle 12 has been parked at a location preferred by the vehicle 12 operator. The first feature may take any of a variety of different forms, including an on-screen button on the HMI 36, an audible input, a tactile input via one or more physical buttons within the vehicle 12 interior and in communication with the ARAPA 34, or the like.

Upon receipt of information from the vehicle 12 operator that the vehicle 12 has been parked, the ARAPA 34 responds by executing a second TS control logic portion 104 that presents one or more options to the vehicle 12 operator via the HMI 36. In some aspects, the one or more options may be presented on the HMI 36 and may include one or more prompts overlaid on a real-time display of the view from one or more cameras 26 capturing optical data about the vehicle's 12 surroundings. The options or prompts in the second TS control logic portion 104 include the presentation the displayed view from the one or more cameras 26, and a plurality of proposed FPVs 44 found within the optical data and within a predefined distance from the vehicle 12. In several aspects, the proposed FPVs 44 at least partially define a current or an idealized position of the vehicle 12 within the parking spot 46. It should be appreciated that the predefined distance may vary from application to application, from location to location, and from vehicle to vehicle without departing from the scope or intent of the present disclosure. In response to the second TS control logic portion 104, the vehicle 12 operator selects some or all of the proposed FPVs 44. In some examples, the vehicle 12 operator selects three to five FPVs 44 with appropriate separations in vision such that all selected FPVs 44 may be simultaneously displayed without prominent risk of falling outside the boundaries of the display area, and different FPVs 44 do not overlap at any reasonable line of sight of the vehicle 12 operator, though the quantity of FPVs 44 selected and the appropriate separations may vary from application to application, location to location, and so forth. However, it should be appreciated that the appropriate separations are selected to guarantee accuracy and precision of the alignment of the vehicle 12 relative to the FPVs 44. That is, the appropriate separations are generally selected to reduce, from a first level to a second level less than the first level, the probability of three-dimensional inaccuracy or misalignment of the vehicles 12 position within the parking spot 46 as the vehicle 12 is autonomously or semi-autonomously parked in repeated iterations in a particular parking spot 46.

The ARAPA 34 may also execute a third TS control logic portion the third TS control logic portion 106 in parallel to, simultaneous with, or sequential to the second TS control logic portion 104. In the third TS control logic portion 106, the ARAPA 34 suggests FPVs 44 that the system 10 has identified as preferable and provides corresponding semantic tags to the vehicle 12 operator with on-HMI 36 prompts. The semantic tags typically include the descriptor texts generated by computer vision modules based on analyzing the selected FPVs 44, e.g. the right-most FPV 44 being selected on FIG. 2B can be tagged "a doodad on the wall". The suggested FPVs 44 may include previously identified or selected FPVs 44 at a particular parking location 48, or FPVs 44 that correspond to previously identified or selected FPVs 44 that have been stored in memory 30. From the second TS control logic portion 104 and third TS control logic portion 106, the ARAPA 34 proceeds to a fourth TS control logic portion 108. It should be appreciated that under certain situations with the lack of system 10 discernable environmental features in the camera 26 view, the FPVs 44 may be selected as items prominent to the vehicle 12 operator's own eyes. In several examples, the FPVs 44 define at least two eye-discernable narrowly-shaped static objects, such as two or more borderlines on white walls, and the selection of FPVs 44 can be performed directly by the vehicle 12 operator's manual delineations on the HMI 36, without these FPVs 44 being suggested by the system 10 first.

During the execution of the fourth TS control logic portion 108, the vehicle 12 operator is offered, via the HMI 36, opportunities to assign a parking spot 46 name for the parking spot 46 currently being occupied by the vehicle 12. A proposed parking spot 46 name may also be automatically provided by the ARAPA 34, and an opportunity to modify the proposed parking spot 46 name may therefore be offered to the vehicle 12 operator. A fifth TS control logic portion 110 is then executed, wherein the parking spot 46 name assigned to the parking spot 46, images, and other necessary data, is then stored in memory 30 along with semantic tags for use in later live session (LS) ARAPA 34 actions.

Figure 4:
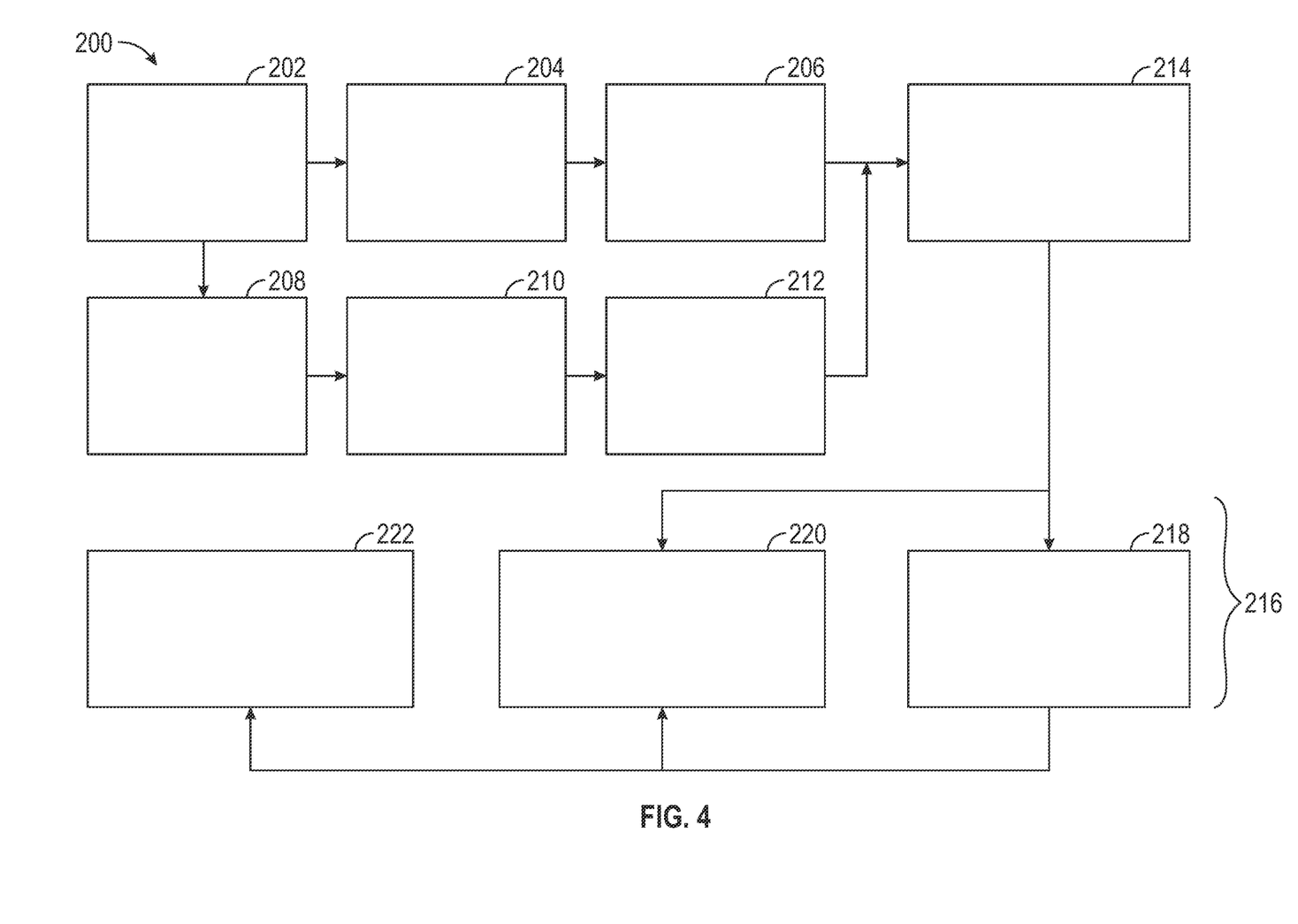
FIG. 4 is a flowchart depicting control logic of a live session of the system for AR-assisted parking with DSAs of FPVs of FIG. 1 according to an exemplary embodiment.

Turning now to FIG. 4 and with continuing reference to FIGS. 1, 2A, 2B, and 3, the LS portion 200 of the ARAPA 34 is shown in further detail in flowchart form. During the LS portion 200, the system executes a series of LS control logic portions of the ARAPA 34 that assist the vehicle 12 operator in parking the vehicle 12 during a live session. Specifically, the vehicle 12 operator drives the vehicle 12 in a parking location 48 in which one or more parking spots 46 is/are available. As the vehicle 12 is driven through the area with the one or more available parking spots 46, the ARAPA 34 identifies parking spots 46. In a first LS control logic portion 202, the ARAPA 34 determines a current distance to a known parking spot 46, is less than or equal to a predefined FPV 44 preview threshold distance away from the vehicle 12. The predefined FPV 44 preview threshold is a predefined distance from the vehicle 12 to the known or target parking spot 46. It should be appreciated that the predefined FPV 44 preview threshold may vary from application to application, from vehicle 12 to vehicle 12, and/or from location to location, however, in some examples, the FPV 44 preview threshold is a variable distance of between approximately six meters and approximately 10 meters from the vehicle 12.

Upon determining that the known parking spot 46 is within the FPV 44 preview threshold distance of a previously trained parking spot 46 from the second LS control logic portion 204, the ARAPA 34 presents the vehicle 12 operator with one or more prompts indicating that the vehicle 12 is within the FPV 44 preview threshold distance of the previously trained parking spot 46 from the second LS control logic portion 204, and offering the vehicle 12 operator one or more previously trained parking spots 46 to select for parking. The vehicle 12 operator selects one of the parking spots 46 and then provides directional inputs via steering adjustments, braking inputs, and acceleration inputs to guide the vehicle 12 towards the previously trained parking spot 46 found by the second LS control logic portion 204. As the vehicle 12 operator guides the vehicle 12, the system 10 executes a third LS control logic portion 206 of the ARAPA 34 that provides AR assistance by overlaying the FPVs 44 on live camera 26 data displayed on the HMI 36 or by directly displaying the FPVs 44 on the HUD 42 so that the FPVs 44 are displayed directly in the vehicle 12 operator's line-of-sight and in positions corresponding to the physical locations of the FPVs 44 from the vehicle 12 operator's optical perspective.

Similarly, the system 10 may execute a fourth LS control logic portion 208 when the system 10 determines that the vehicle 12 is within the FPV 44 preview threshold distance of one or more previously saved FPVs 44 of parking spots 46 at the same general parking location 48 (i.e. parking lot), and where the previously saved FPVs 44 are of sufficient confidence that they may be used to denote the physical location and three-dimensional parameters of a parking spot 46. Upon identifying previously saved FPVs 44 of parking spots 46 that have not previously been chosen by the vehicle 12 operator, the system 10 executes a fifth LS control logic portion 210 that conditionally displays a preview of the identified previously saved FPVs 44 on the HUD 42 and/or on the HMI 36. More specifically, if the previously saved FPVs 44 can be identified before the vehicle 12 enters a location at a distance equal to or less than a predefined FPV 44 alignment threshold distance to a previously chosen parking spot 46, the system 10 optionally displays a preview of the identified, previously saved FPVs 44 to serve as enhanced steering guidance to the vehicle 12 operator. The predefined FPV 44 alignment threshold may vary from application to application, vehicle 12 to vehicle 12 and/or location to location without departing from the scope or intent of the present disclosure. In some examples, the predefined FPV 44 alignment threshold is generally smaller than the FPV 44 preview threshold, and may be between about one and a half (1.5) to about three (3) meters.

The vehicle 12 operator may select a parking spot 46 within the identified, previously saved FPVs 44 via a selection or prompt displayed by the fifth LS control logic portion 210, and then navigate or otherwise guide the vehicle 12 into a parking spot 46 denoted by the previously saved FPVs 44. As the vehicle 12 operator guides the vehicle 12, the system 10 executes a sixth LS control logic portion 212 of the ARAPA 34 that provides AR assistance by overlaying the FPVs 44 on live camera 26 data displayed on the HMI 36 or by directly displaying the FPVs 44 on the HUD 42 so that the FPVs 44 are displayed directly in the vehicle 12 operator's line-of-sight and in positions corresponding to the physical locations of the FPVs 44 from the vehicle 12 operator's optical perspective. In several aspects, a path to the identified, previously saved FPVs 44 may be displayed on the HUD and/or the HMI 36 in a different style, color, layout, or the like, in comparison to a path to a previously trained parking spot 46.

The system 10 then executes a seventh LS control logic portion 214 that determines a current distance to the chosen parking spot 46, and compares the current distance to the predefined FPV 44 alignment threshold before engaging an FPV 44 alignment mode 216 of the ARAPA 34.

In the FPV 44 alignment mode 216, the system 10 executes a series of LS control logic portions that assist the vehicle 12 operator in positioning the vehicle 12 correctly and completely within the chosen parking spot 46. More specifically, the FPV 44 alignment mode 216 assists the vehicle operator 12 by executing an eighth LS control logic portion 218 that utilizes AR to display previously-identified or saved FPVs 44 on the HMI 36 and/or the HUD 42, thereby providing the vehicle 12 operator with references that the vehicle 12 operator utilizes the align the vehicle 12 within the parking spot 46 in real-time. The system 10 also executes a ninth LS control logic 220 of the ARAPA 34 in which the vehicle 12 operator checks alignments of the saved FPVs 44 with corresponding features of the real-world environment for enhanced parking assistance and steers, or otherwise maneuvers the vehicle 12.

In several aspects in either the eighth or ninth LS control logic portions 218, 220, in the alignment mode 216, when utilizing the HMI 36 for alignment, saved FPV 44 images are displayed at original pixel locations and superimposed onto a real-time camera 26 view of the area surrounding the vehicle 12. The arrangements of the foreground, background and relevant transparencies configured appropriately so that the system 10 can clearly indicate how exactly the saved FPV 44 images are aligned with respective live FPVs 44 of the same reference points. Similarly, when utilizing AR via the HUD 42 for alignment, the HUD 42 displays locations and projected shapes of the saved FPV 44 images calculated based on a driver-monitoring system (DMS) view of the vehicle 12 operator's line of sight. The saved FPV 44 images are then displayed with appropriate brightness, subject to ambient light and the vehicle 12 operator's real-time adjustment, so that the HUD 42 clearly indicates how exactly the saved FPV 44 images are aligned to respective live environmental objects that the vehicle 12 operator observes directly through the vehicle 12 windshield. It should be appreciated that the DMS may include a variety of sensors 14 disposed on or in the vehicle 12 and monitoring the vehicle's 12 occupants, and specifically operators of the vehicle 12. The sensors 14 of the DMS may include cameras 26, thermal sensors, sensors capable of registering or detecting haptic inputs, infrared sensors, and the like. The sensors 14 of the DMS may detect a vehicle 12 operator's seating position, head position, eye position, hand position, or the like, and may use such information to determine how the vehicle 12 operator is actively managing or maneuvering the vehicle 12 and vehicle functions.

In a tenth LS control logic portion 222, the system 10 notifies the vehicle 12 operator that the vehicle 12 has been completely parked when the saved FPV 44 images are sufficiently aligned to real-world FPVs 44 or environmental objects as viewed on either or both of the HMI 36 and the HUD 42. It should be appreciated that the system 10 and/or the vehicle 12 operator may determine that the vehicle 12 has been completely parked and aligned within the parking spot 46 when longitudinal and transverse positions of saved FPVs 44 are closely aligned with real-world FPVs 44 or environmental objects. It should also be appreciated that, the notion of being "sufficiently aligned" is typically the operator's intuitive judgement or the system's evaluation about the saved FPVs achieving a sufficiently high intersection-over-union (IOU) metric with their real-world counterparts, e.g. the IOU being no less than the threshold of 95% to the operator's eye observation.

Figure 5:
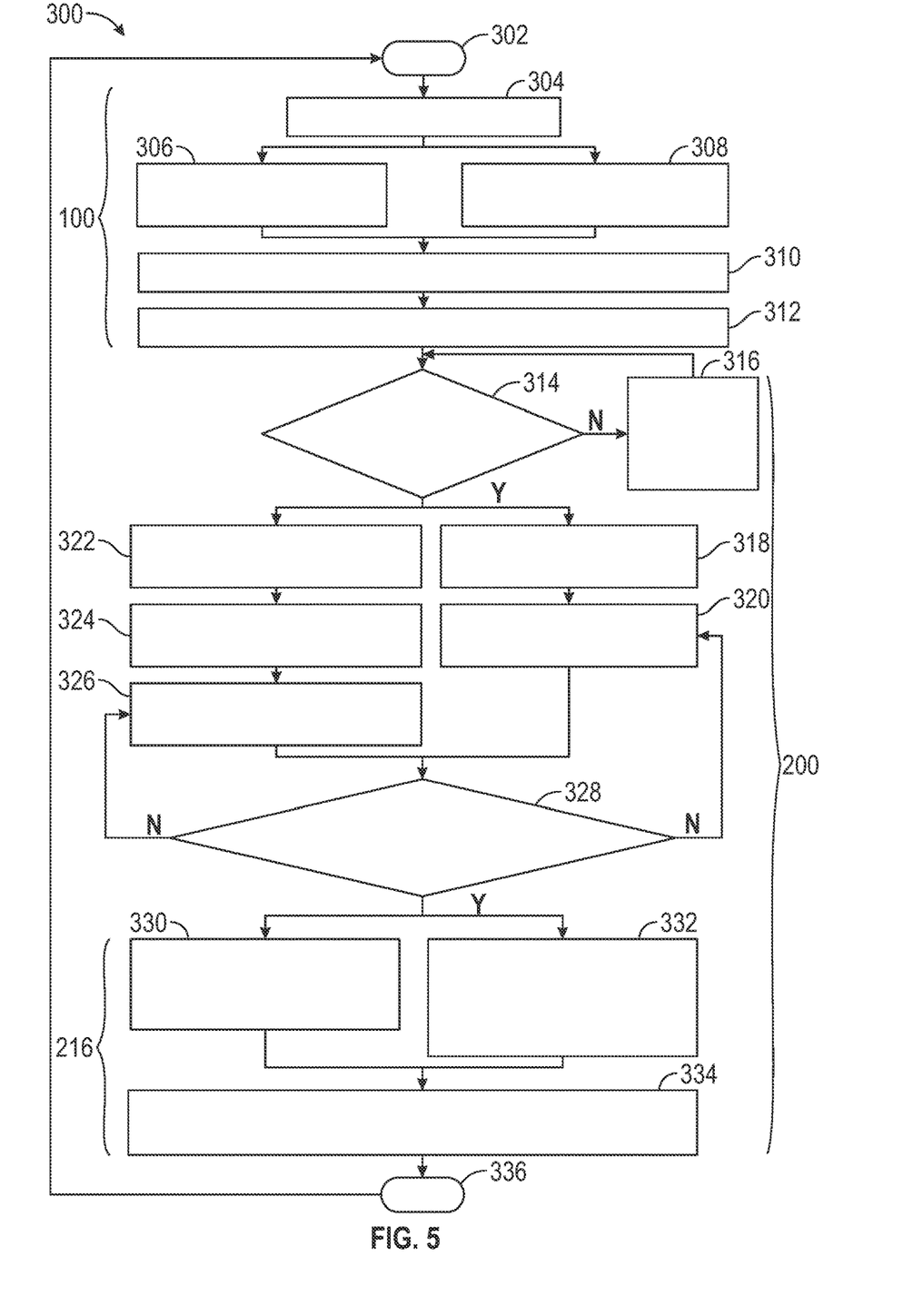
FIG. 5 is a flowchart depicting a method for AR-assisted parking with DSAs of FPVs according to an exemplary embodiment.

Turning now to FIG. 5, and with continuing reference to FIGS. 1, 2A, 2B, 3 and 4, a method 300 for AR-assisted parking with operator-in-loop selections and alignments of FPVs 44 is shown in flowchart form. The method 300 begins at block 302. At block 304 the vehicle 12 operator initiates a training session of the ARAPA 34 by maneuvering the vehicle 12 into a new parking spot 46 and indicating the completion of a parking process via the HMI 36. At block 306, the system 10 presents on the HMI 36 real-time camera 26 views intended for FPV 44 selection with prompts to the vehicle 12 operator. At block 308, which may be executed simultaneously with, in parallel to, or sequential to the processes carried out at block 306, the ARAPA 34 suggests FPVs 44 that the system 10 has identified as preferable and provides corresponding semantic tags to the vehicle 12 operator with on-HMI 36 prompts. The suggested FPVs 44 may include previously identified or selected FPVs 44 at a particular parking spot 46, or FPVs 44 that correspond to previously identified or selected FPVs 44 that have been stored in memory 30. From blocks 306 and 308, the method 300 proceeds to block 310 where the vehicle 12 operator is offered, via the HMI 36, opportunities to assign a parking spot 46 name for the parking spot 46 currently being occupied by the vehicle 12. A proposed parking spot 46 name may also be automatically provided by the ARAPA 34, and an opportunity to modify the proposed parking spot 46 name may therefore be offered to the vehicle 12 operator. From block 310, the method 300 proceeds to block 312 where the parking location name assigned to the parking spot 46, images, and other necessary data, is stored in memory 30 along with semantic tags for use in later live session (LS) ARAPA 34 actions.

From block 312, the method 300 enters a live session of the ARAPA 34 beginning at block 314. Specifically, at block 314 the vehicle 12 operator drives the vehicle 12 in a parking location 48 in which one or more parking spots 46 is/are available. As the vehicle 12 is driven through the parking location 48 with the one or more available parking spots 4, the ARAPA 34 identifies parking spots 46 and compares them to a predefined FPV 44 preview threshold distance. That is, at block 314, the ARAPA 34 determines whether a current distance to a known parking spot 46, is less than or equal to a predefined FPV 44 preview threshold distance away from the vehicle 12. The predefined FPV 44 preview threshold is a predefined distance from the vehicle 12 to the known or target parking spot 46. It should be appreciated that the predefined FPV 44 preview threshold may vary from application to application, from vehicle 12 to vehicle 12, and/or from location to location, however, in some examples, the FPV 44 preview threshold is a variable distance of between approximately six meters and approximately 10 meters from the vehicle 12.

Upon determining that the known parking spot 46 is greater than the FPV 44 preview threshold distance, the method 300 proceeds to block 316 where the system 10 continues to search for parking spots 46 before proceeding again to block 314.

Upon determining that the known parking spot 46 is equal to or less than or equal to the FPV 44 preview threshold, the system 10 then offers one or more prompts to the vehicle 12 operator via the HMI 36. More specifically, the ARAPA 34 presents the vehicle 12 operator with one or more previously trained parking spots 46 at block 318.

When the system 10 determines that the vehicle 12 is within the FPV 44 preview threshold distance of a previously trained parking spot 46 from block 318, the ARAPA 34 presents the vehicle 12 operator with one or more prompts indicating that the vehicle 12 is within the FPV 44 preview threshold distance of the previously trained parking spot 46 from block 318. The vehicle 12 operator then provides directional inputs via steering adjustments, braking inputs, and acceleration inputs to guide the vehicle 12 towards the previously trained parking spot 46 found by block 318. As the vehicle 12 operator guides the vehicle 12, the method 300 proceeds to block 320 where the ARAPA 34 provides AR assistance by overlaying the FPVs 44 on live camera 26 data displayed on the HMI 36 or by directly displaying the FPVs 44 on the HUD 42 so that the FPVs 44 are displayed directly in the vehicle 12 operator's line-ofsight and in positions corresponding to the physical locations of the FPVs 44 from the vehicle 12 operator's optical perspective.

The method 300 also proceeds to blocks 322 through 326, which may be carried out in parallel to, simultaneously, or sequentially with the method 300 steps of blocks 318 and 320. At block 322 the system 10 determines that the vehicle 12 is within the FPV 44 preview threshold distance of one or more previously saved FPVs 44 of parking spot 46 at the same general parking location 48 (i.e. parking lot), and where the previously saved FPVs 44 are of sufficient confidence that they may be used to denote the physical location and three-dimensional parameters of a parking spot 46. Upon identifying previously saved FPVs 44 of parking spots 46 that have not previously been chosen by the vehicle 12 operator, the method 300 proceeds to block 324 and the system 10 causes the ARAPA 34 to conditionally display a preview of the identified previously saved FPVs 44 on the HUD 42 and/or on the HMI 36. More specifically, the previously saved FPVs 44 can be identified before the vehicle 12 enters a location within a predefined FPV 44 alignment threshold to a previously chosen parking spot 46, the system 10 optionally displays a preview of the identified, previously saved FPVs 44 to serve as enhanced steering guidance to the vehicle 12 operator. The predefined FPV 44 alignment threshold may vary from application to application, vehicle 12 to vehicle 12 and/or location to location without departing from the scope or intent of the present disclosure. In some examples, the predefined FPV 44 alignment threshold is generally smaller than the FPV 44 preview threshold, and may be between about one and a half (1.5) to about three (3) meters.

The vehicle 12 operator may select one a parking spot 46 within the identified, previously saved FPVs 44 via a selection or prompt displayed at block 324, and then navigate or otherwise guide the vehicle 12 into a parking spot 46 denoted by the previously saved FPVs 44. As the vehicle 12 operator guides the vehicle 12, the method 300 proceeds to block 326 and the ARAPA 34 provides AR assistance by overlaying the FPVs 44 on live camera 26 data displayed on the HMI 36 or by directly displaying the FPVs 44 on the HUD 42 so that the FPVs 44 are displayed directly in the vehicle 12 operator's line-of-sight and in positions corresponding to the physical locations of the FPVs 44 from the vehicle 12 operator's optical perspective. In several aspects, a path to the identified, previously saved FPVs 44 may be displayed on the HUD and/or the HMI 36 in a different style, color, layout, or the like, in comparison to a path to a previously trained parking spot 46.

The method 300 then proceeds to block 328 and causes the system 10 to determine a current distance to the chosen parking spot 46, and compares the current distance to the predefined FPV 44 alignment threshold before engaging the FPV 44 alignment mode 216 of the ARAPA 34. When the current distance of the vehicle 12 to the chosen parking spot 46 is greater than the FPV 44 alignment threshold distance, the method 300 returns to blocks 320 and/or 326. However, when the current distance of the vehicle 12 to the chosen parking spot 46 is less than or equal to the predefined FPV 44 alignment threshold distance, the method engages the FPV 44 alignment mode 216.

In the FPV 44 alignment mode 216, the method 300 assists the vehicle 12 operator in positioning the vehicle 12 correctly and completely within the chosen parking spot 46. More specifically, the method 300 utilizes the FPV 44 alignment mode 216 to assist the vehicle operator 12 at block 330 by utilizing AR to display previously-identified or saved FPVs 44 on the HMI 36 and/or the HUD 42, thereby providing the vehicle 12 operator with references that the vehicle 12 operator utilizes the align the vehicle 12 within the parking spot 46 in real-time.

At block 332, the vehicle 12 operator checks alignments of the saved FPVs 44 with corresponding features of the real-world environment for enhanced parking assistance and steers, or otherwise maneuvers the vehicle 12. At either of blocks 330 and 332, in the alignment mode 216, when utilizing the HMI 36 for alignment, the method 300 causes the ARAPA 34 to display saved FPV 44 images at original pixel locations on the HMI 36 and superimposed onto a real-time camera 26 view of the area surrounding the vehicle 12. The arrangements of the foreground, background and relevant transparencies configured appropriately so that the system 10 can clearly indicate how exactly the saved FPV 44 images are aligned with respective live FPVs 44 of the same reference points. Similarly, when utilizing AR via the HUD 42 for alignment, the HUD 42 displays locations and projected shapes of the saved FPV 44 images calculated based on a driver-monitoring system (DMS) view of the vehicle 12 operator's line of sight. The saved FPV 44 images are then displayed with appropriate brightness, subject to ambient light and the vehicle 12 operator's real-time adjustment, so that the HUD 42 clearly indicates how exactly the saved FPV 44 images are aligned to respective live environmental objects that the vehicle 12 operator observes directly through the vehicle 12 windshield. It should be appreciated that the DMS may include a variety of sensors 14 disposed on or in the vehicle 12 and monitoring the vehicle's 12 occupants, and specifically operators of the vehicle 12. The sensors 14 of the DMS may include cameras 26, thermal sensors, sensors capable of registering or detecting haptic inputs, infrared sensors, and the like. The sensors 14 of the DMS may detect a vehicle 12 operator's seating position, head position, eye position, hand position, or the like, and may use such information to determine how the vehicle 12 operator is actively managing or maneuvering the vehicle 12 and vehicle functions.

From blocks 330 and/or 332, the method 300 proceeds to block 334 where the vehicle 12 operator determines that the vehicle 12 has been completely parked when the saved FPV 44 images are sufficiently aligned to real-world FPVs 44 or environmental objects as viewed on either or both of the HMI 36 and the HUD 42. It should be appreciated that the vehicle 12 operator may determine that the vehicle 12 has been completely parked and aligned within the parking spot 46 when longitudinal and transverse positions of saved FPVs 44 are closely aligned with real-world FPVs 44 or environmental objects. At block 336, the method 300 ends. In several aspects, the method 300 may run continuously, iteratively, or only upon activation by the vehicle 12 operator and/or by an automated parking application, or the like, without departing from the scope or intent of the present disclosure. As noted above, the notion of being "sufficiently aligned" is the operator's intuitive judgement or the system's evaluation about the saved FPVs achieving a sufficiently high intersection-over-union (IOU) metric with their real-world counterparts, e.g. the IOU being no less than the threshold of 95% to the operator's eye observation.

A system 10 and method 300 for AR-assisted parking with operator-in-loop selections and alignments of FPVs 44 of the present disclosure offers several advantages. These include the ability to utilize an AR display scheme for use in SLAM-based vehicle 12 parking assistance that prevents robustness deterioration due to the removal or increase of feature points at a given geographic location, as well as accounting for feature descriptor variations caused by lighting condition changes. Further, the system 10 and method 300 of the present disclosure require only minimal input from the vehicle 12 operator in observing and selecting environmental features, and alleviates or decreases the need for an abundance of feature points for underlying SLAM processes, while ensuring the parking assistance system effectively and accurately represents or indicates longitudinal and transverse offsets of the vehicle 12 relative to FPVs 44, thereby simplifying parking procedures and increasing vehicle 12 operator confidence while maintaining or decreasing system 10 complexity.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for augmented-reality (AR)-assisted vehicle parking with operator-in-loop selections and alignments of feature point vicinities (FPVs), the system comprising:
   a vehicle;
   one or more human-machine interfaces (HMIs) disposed within the vehicle;
   one or more sensors disposed on the vehicle and detecting FPVs of a parking location;
   one or more controllers, each of the one or more controllers having a processor, a memory, and one or more input/output (I/O) ports, the I/O ports in communication with the one or more sensors and the one or more HMIs; the memory storing programmatic control logic; the processor executing the programmatic control logic; the programmatic control logic including an AR-assisted parking application (ARAPA), a vehicle operator activating the ARAPA via the HMI upon completing parking at a parking spot at the parking location; the ARAPA comprising:
   a training session (TS) portion; and
   a live session (LS) portion,
   wherein in the TS portion, the ARAPA is trained to recognize FPVs of the parking spot at the parking location; wherein the ARAPA suggests, via the HMI, FPVs and semantic tags corresponding to parking spots that the system has previously identified at the parking location; offers, via the HMI, automatically generated proposed parking spot names and opportunities for the vehicle operator to alter the proposed parking spot names; and stores the proposed parking spot names and semantic tags in memory for use in the LS portion of the ARAPA; and
   wherein in the LS portion, the ARAPA prompts a vehicle operator to select the parking spot, and guides the vehicle operator into the parking spot by displaying previously trained FPVs overlaid onto live sensor data displayed on the HMI and instructing the vehicle operator to align the previously trained FPVs with corresponding real-world FPVs of the parking spot by maneuvering the vehicle.

2. The system of claim 1, wherein the TS portion further comprises:
   a first TS control logic portion wherein the vehicle operator indicates that the vehicle has been parked in a preferred parking spot by selecting a first feature of the ARAPA via the HMI.

3. The system of claim 2, wherein the TS portion further comprises:
   a second TS control logic portion wherein the ARAPA utilizes the HMI to present a plurality of proposed FPVs overlaid on a real-time display of a view from the one or more sensors, wherein the proposed FPVs at least partially define a current or an idealized position of the vehicle within the preferred parking spot; and
   control logic that receives, via the HMI, inputs from the vehicle operator selecting some or all of the plurality of proposed FPVs, each of the proposed FPVs having appropriate separations from other proposed FPVs, wherein the appropriate separation is chosen such that all selected FPVs may be simultaneously displayed on the HMI and so that different FPVs do not overlap at any line of sight of the vehicle operator; and wherein the appropriate separation reduces a potential for vehicle mis-alignment within the parking spot from a first level to a second level less than the first level as the vehicle is parked.

4. The system of claim 1, wherein the LS portion further comprises:
   a first LS control logic portion that determines that a current distance between the vehicle and one or more previously trained parking spots is less than or equal to a predefined FPV preview threshold distance, wherein the FPV preview threshold distance is between approximately six meters and approximately 10 meters; and
   a second LS control logic portion that offers, via the HMI, one or more prompts to the vehicle operator, wherein the one or more prompts request the vehicle operator to select one of the one or more previously trained parking spots within the FPV preview threshold distance that the vehicle operator intends to park within.

5. The system of claim 4, wherein the LS portion further comprises:
   a third LS control logic portion that provides augmented reality (AR) assistance to the vehicle operator as the vehicle operator provides directional inputs via steering adjustments, braking inputs, and acceleration inputs to guide the vehicle towards and into the previously trained parking spot, wherein the AR assistance overlays FPVs of the previously trained parking spot on one or more of live sensor data displayed on the HMI and on a heads-up display (HUD) of the vehicle so that the FPVs are displayed directly in a line-of-sight of the vehicle operator and in positions corresponding to actual physical locations of the FPVs from an optical perspective of the vehicle operator.

6. The system of claim 5, wherein the LS portion further comprises:
   a fourth LS control logic that determines that the vehicle is within the FPV preview threshold distance of one or more previously saved FPVs of parking spots in a parking location; and
   a fifth LS control logic that conditionally displays a preview of the identified previously saved FPVs on one or more of the HMI and a head-sup-display (HUD), and uses previously-identified FPVs as enhanced steering guidance for the vehicle operator to align the vehicle within a parking spot to a distance that is equal to or less than a predefined FPV alignment threshold distance.

7. The system of claim 6, wherein the LS portion further comprises:

a sixth LS control logic that provides AR assistance to the vehicle operator as the vehicle operator provides directional inputs via steering adjustments, braking inputs, and acceleration inputs to guide the vehicle towards and into the parking spot identified by saved previously-identified FPVs, wherein the AR assistance overlays the saved previously-identified FPVs on one or more of live sensor data displayed on the HMI and on the HUD of the vehicle so that the FPVs are displayed directly in a vehicle operator's line-of-sight and in positions corresponding to actual physical locations of the FPVs from the vehicle operator's optical perspective, and wherein a path to the saved previously-identified FPVs is displayed on one or more of the HUD and the HMI in a different style, color, or layout, in comparison to a path to a previously trained parking spot.

8. The system of claim 7, wherein the LS portion further comprises:

a seventh LS control logic that determines a current distance of the vehicle to a parking spot is less than or equal to the FPV alignment threshold distance and engages an FPV alignment mode of the ARAPA; and an eighth LS control logic that utilizes AR to display previously-identified or saved FPVs on one or more of the HMI and the HUD, thereby providing the vehicle operator with references that the vehicle operator utilizes the align the vehicle within the parking spot in real-time;

a ninth LS control logic that causes the vehicle operator to check alignments of the saved FPVs with corresponding features of a real-world environment for enhanced parking assistance and steers, or otherwise maneuvers the vehicle; and a tenth LS control logic that notifies the vehicle operator that the vehicle has been completely parked when the saved FPV are aligned to real-world FPVs or environmental objects as viewed on either or both of the HMI and the HUD.

9. A method for augmented-reality (AR)-assisted vehicle parking with operator-in-loop selections and alignments of feature point vicinities (FPVs), the method comprising:

detecting FPVs of a parking location with one or more sensors disposed on a vehicle;

executing programmatic control logic stored within a memory of one or more controllers in communication with the one or more sensors and in communication with one or more human-machine interfaces (HMIs) disposed within the vehicle, each of the one or more controllers having a processor, the memory, and one or more input/output (I/O) ports, the I/O ports in communication with the one or more sensors and the one or more HMIs; the processor executing control logic including an AR-assisted parking application (ARAPA);

activating, via a vehicle operator input through the HMI, the ARAPA upon completing parking at a parking spot at the parking location; the ARAPA comprising:

training the ARAPA, in a training session (TS) portion, to recognize FPVs of a parking spot at the parking location; and prompting the vehicle operator, in a live session (LS) portion of the ARAPA, to select the parking spot; wherein the LS portion further comprises:

determining that a current distance between the vehicle and one or more previously trained parking spots is less than or equal to a predefined FPV preview threshold distance, wherein the FPV preview threshold distance is between approximately six meters and approximately 10 meters;

offering, via the HMI, one or more prompts to the vehicle operator, wherein the one or more prompts request the vehicle operator to select one of the one or more previously trained parking spots within the FPV preview threshold distance that the vehicle operator intends to park within; and providing augmented reality (AR) assistance to the vehicle operator as the vehicle operator provides directional inputs via steering adjustments, braking inputs, and acceleration inputs to guide the vehicle towards and into the previously trained parking spot, wherein the AR assistance overlays FPVs of the previously trained parking spot on one or more of live sensor data displayed on the HMI and on a heads-up display (HUD) of the vehicle so that the FPVs are displayed directly in a line-of-sight of the vehicle operator and in positions corresponding to actual physical locations of the FPVs from an optical perspective of the vehicle operator;

guiding the vehicle operator into the parking spot by displaying previously trained FPVs overlaid onto live sensor data displayed on the HMI; and instructing the vehicle operator to align the previously trained FPVs with corresponding real-world FPVs of the parking spot by maneuvering the vehicle.

10. The method of claim 9, wherein the TS portion further comprises:

indicating, via a vehicle operator input to a first feature of the ARAPA in the HMI, that the vehicle has been parked in a preferred parking spot.

11. The method of claim 10, wherein the TS portion further comprises:

presenting, via the HMI, a plurality of proposed FPVs overlaid on a real-time display of a view from the one or more sensors, wherein the proposed FPVs at least partially define a current or an idealized position of the vehicle within the preferred parking spot; and receiving, via the HMI, inputs from the vehicle operator selecting some or all of the plurality of proposed FPVs, each of the proposed FPVs having appropriate separations from other proposed FPVs, wherein the appropriate separation is chosen such that all selected FPVs may be simultaneously displayed on the HMI and so that different FPVs do not overlap at any line of sight of the vehicle operator; and wherein the appropriate separation reduces a potential for vehicle mis-alignment within the parking spot from a first level to a second level less than the first level as the vehicle is parked.

12. The method of claim 11, wherein the TS portion further comprises:

suggesting to the vehicle operator, via the HMI, FPVs and semantic tags corresponding to parking spots that the ARAPA has previously identified at the parking location;

offering, via the HMI, automatically generated proposed parking spot names and opportunities for the vehicle operator to alter the proposed parking spot names; and storing the proposed parking spot names and semantic tags in memory for use in the LS portion of the ARAPA.

13. The method of claim 9, wherein the LS portion further comprises:
  determining that the vehicle is within the FPV preview threshold distance of one or more previously saved FPVs of parking spots in a parking location; and
  conditionally displaying a preview of the previously saved FPVs on one or more of the HMI and a head-sup-display (HUD), and using previously saved FPVs as enhanced steering guidance for the vehicle operator to align the vehicle within a parking spot to a distance that is equal to or less than a predefined FPV alignment threshold distance.

14. The method of claim 13, wherein the LS portion further comprises:
  providing AR assistance to the vehicle operator as the vehicle operator provides directional inputs via steering adjustments, braking inputs, and acceleration inputs to guide the vehicle towards and into the parking spot identified by previously-identified FPVs, wherein the AR assistance overlays the previously-identified FPVs on one or more of live sensor data displayed on the HMI and on the HUD of the vehicle so that the FPVs are displayed directly in a line-of-sight of the vehicle operator and in positions corresponding to actual physical locations of the FPVs from an optical perspective of the vehicle operator, and wherein a path to the identified, previously saved FPVs is displayed on one or more of the HUD and the HMI in a different style, color, or layout, in comparison to a path to a previously trained parking spot.

15. The method of claim 14, wherein the LS portion further comprises:
  determining a current distance of the vehicle to a parking spot is less than or equal to the FPV alignment threshold distance and engages an FPV alignment mode of the ARAPA; and
  utilizing AR to display previously-identified or saved FPVs on one or more of the HMI and the HUD, thereby providing the vehicle operator with references that the vehicle operator utilizes the align the vehicle within the parking spot in real-time;
  causing the vehicle operator to check alignments of the saved FPVs with corresponding features of a real-world environment for enhanced parking assistance and steers, or otherwise maneuvers the vehicle; and
  notifying the vehicle operator that the vehicle has been completely parked when the saved FPV are aligned to real-world FPVs or environmental objects as viewed on either or both of the HMI and the HUD.

16. A method for augmented-reality (AR)-assisted vehicle parking with operator-in-loop selections and alignments of feature point vicinities (FPVs), the method comprising:
  detecting FPVs of a parking location with one or more sensors disposed on a vehicle;
  executing programmatic control logic stored within a memory of one or more controllers in communication with the one or more sensors and in communication with one or more human-machine interfaces (HMIs) disposed within the vehicle, each of the one or more controllers having a processor, the memory, and one or more input/output (I/O) ports, the I/O ports in communication with the one or more sensors and the one or more HMIs; the processor executing control logic including an AR-assisted parking application (ARAPA);
  activating, via a vehicle operator input through the HMI, the ARAPA upon completing parking at a parking spot at the parking location; the ARAPA including control logic comprising:
  training the ARAPA, in a training session (TS) portion, to recognize FPVs of a parking spot at the parking location, including:
    indicating, via a vehicle operator input to a first feature of the ARAPA in the HMI, that the vehicle has been parked in a preferred parking spot;
    presenting, via the HMI, a plurality of proposed FPVs overlaid on a real-time display of a view from the one or more sensors, wherein the proposed FPVs at least partially define a current or an idealized position of the vehicle within the preferred parking spot;
    receiving, via the HMI, inputs from the vehicle operator selecting some or all of the plurality of proposed FPVs, each of the proposed FPVs having appropriate separations from other proposed FPVs, wherein the appropriate separation is chosen such that all selected FPVs may be simultaneously displayed on the HMI and so that different FPVs do not overlap at any line of sight of the vehicle operator; and wherein the appropriate separation reduces a potential for vehicle mis-alignment within the parking spot from a first level to a second level less than the first level as the vehicle is parked;
    suggesting to the vehicle operator, via the HMI, FPVs and semantic tags corresponding to parking spots that the ARAPA has previously identified at the parking location;
    offering, via the HMI, automatically generated proposed parking spot names and opportunities for the vehicle operator to alter the proposed parking spot names; and
    storing the proposed parking spot names and semantic tags in memory for use in a live-session (LS) portion of the ARAPA;
  prompting the vehicle operator, in an LS portion of the ARAPA, to select a parking spot as the vehicle operator navigates through a parking location with one or more parking spots;
    determining that a current distance between the vehicle and one or more previously trained parking spots is less than or equal to a predefined FPV preview threshold distance, wherein the FPV preview threshold distance is between approximately six meters and approximately ten meters;
    offering, via the HMI, one or more prompts to the vehicle operator, wherein the one or more prompts request the vehicle operator to select one of the one or more previously trained parking spots within the FPV preview threshold distance that the vehicle operator intends to park within;
    providing augmented reality (AR) assistance to the vehicle operator as the vehicle operator provides directional inputs via steering adjustments, braking inputs, and acceleration inputs to guide the vehicle towards and into the previously trained parking spot, wherein the AR assistance overlays FPVs of the previously trained parking spot on one or more of live sensor data displayed on the HMI and on a heads-up display (HUD) of the vehicle so that the FPVs are displayed directly in a line-of-sight of the vehicle operator and in positions corresponding to actual physical locations of the FPVs from an optical perspective of the vehicle operator;

determining that the vehicle is within the FPV preview threshold distance of one or more previously saved FPVs of parking spots in a parking location;

conditionally displaying a preview of the previously saved FPVs on one or more of the HMI and a head-sup-display (HUD), and using previously-identified FPVs as enhanced steering guidance for the vehicle operator to align the vehicle within a parking spot to a distance that is equal to or less than a predefined FPV alignment threshold distance;

providing AR assistance to the vehicle operator as the vehicle operator provides directional inputs via steering adjustments, braking inputs, and acceleration inputs to guide the vehicle towards and into the parking spot identified by previously-identified FPVs, wherein the AR assistance overlays the previously-identified FPVs on one or more of live sensor data displayed on the HMI and on the HUD of the vehicle so that the FPVs are displayed directly in the vehicle operator's line-of-sight and in positions corresponding to actual physical locations of the FPVs from the vehicle operator's optical perspective, and wherein a path to the identified, previously saved FPVs is displayed on one or more of the HUD and the HMI in a different style, color, or layout, in comparison to a path to a previously trained parking spot; and instructing the vehicle operator to align the previously trained FPVs with corresponding real-world FPVs of the parking spot by maneuvering the vehicle by:
  determining a current distance of the vehicle to a parking spot is less than or equal to the FPV alignment threshold distance and engages an FPV alignment mode of the ARAPA;
  utilizing AR to display previously-identified or saved FPVs on one or more of the HMI and the HUD, thereby providing the vehicle operator with references that the vehicle operator utilizes the align the vehicle within the parking spot in real-time;
  causing the vehicle operator to check alignments of the saved FPVs with corresponding features of a real-world environment for enhanced parking assistance and steers, or otherwise maneuvers the vehicle; and
  notifying the vehicle operator via one or more of the HUD and the HMI that the vehicle has been completely parked when the saved FPV are aligned to real-world FPVs or environmental objects as viewed on either or both of the HMI and the HUD.

* * * * *